United States Patent
Bendell et al.

(10) Patent No.: US 6,595,276 B2
(45) Date of Patent: Jul. 22, 2003

(54) VEHICULAR HEATING AND AIR CONDITIONING UNIT INCLUDING PLURAL AIR-MIXING SPACES

(75) Inventors: Ian Bendell, Stuttgart (DE); Peter Bernloehr, Stuttgart (DE); Wolfgang Dieksander, Filderstadt (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/740,904

(22) Filed: Dec. 21, 2000

(65) Prior Publication Data

US 2001/0004015 A1 Jun. 21, 2001

(30) Foreign Application Priority Data

Dec. 21, 1999 (DE) .......................................... 199 62 084

(51) Int. Cl.[7] ................................................ B60H 1/00
(52) U.S. Cl. .................... 165/202; 165/203; 165/42; 165/43; 237/12.3 A; 237/12.3 B; 454/156
(58) Field of Search ................................ 165/202, 203, 165/42, 43; 237/12.3 A, 12.3 B; 454/69, 156, 75

(56) References Cited

U.S. PATENT DOCUMENTS

| | | | | |
|---|---|---|---|---|
| 4,242,950 A | * | 1/1981 | Grossmann | ......... 237/12.3 A X |
| 5,267,896 A | * | 12/1993 | Petters et al. | ............. 165/42 X |
| 5,950,711 A | * | 9/1999 | Bendell | ........................ 165/42 |
| 6,206,092 B1 | * | 3/2001 | Beck et al. | .................. 165/203 |

FOREIGN PATENT DOCUMENTS

| | | |
|---|---|---|
| DE | 197 43 823 | 4/1998 |
| DE | 197 39 578 | 3/1999 |
| FR | 2 717 747 | 9/1995 |

* cited by examiner

*Primary Examiner*—Ljiljana Ciric
(74) *Attorney, Agent, or Firm*—Foley & Lardner

(57) ABSTRACT

A heating and air-conditioning unit includes a heating unit, at least one cold-air duct guided around the heating unit, and air-mixing spaces downstream of the heating unit. At least one partition separates the mixing spaces into which cold and heated air can each be controllably introduced by air-flow control elements. As a result, air which can be temperature-controlled separately, can be supplied to at least two zones. To minimize the structural space occupied by the unit, at least one first partial air stream flows through a first assigned subregion (22VR and 22VL) of the heating unit (22) in a first direction, and at least one second partial air stream flows through a second assigned subregion (22HR and 22HL) of the heating unit (22) in a second direction opposed to the first direction.

11 Claims, 4 Drawing Sheets

VEHICULAR HEATING AND AIR CONDITIONING UNIT INCLUDING PLURAL AIR-MIXING SPACES

BACKGROUND OF THE INVENTION

The present invention relates to a heating or air-conditioning unit for a motor vehicle, which can be used to supply individual air-conditioning zones of the vehicle passenger compartment with air that can be temperature-controlled separately.

FR 2717747 discloses an air-conditioning system which can be used to separately set the temperature of the air supplied to the different air-conditioning zones, namely "at the front on the right" (front passenger's seat) and "at the front on the left" (driver's seat) and also for a "rear compartment on the left" and for a "rear compartment on the right". For this purpose, the air-conditioning system has two air-conditioning units for respectively supplying the left or right half of the vehicle. The front region and the rear region can be supplied with air controlled to different temperatures by each of the air-conditioning units. This air-conditioning system is very complicated, since it has two air-conditioning units, each having a fan, evaporator and heating unit along with corresponding air ducts. The system is therefore correspondingly expensive and can only be used in large-capacity vehicles because it requires a large amount of space.

DE-A 197 39 578 discloses an air-conditioning unit with air-side control (air-blending), in which the space downstream of a heating unit is divided into four air-mixing spaces which lie next to one another and are separated by partitions. In these air-mixing spaces, cold air guided below the heating unit is mixed with hot air. The partitions extend below the heating unit and divide the cold-air bypass into four subducts as well. An individual temperature can be set in each mixing space independently of the temperatures in the other mixing spaces, via hot-air flaps arranged directly downstream of the heating unit and cold-air flaps that selectively close the cold-air bypasses. The air from the individual air-mixing spaces which has been temperature-controlled individually can be supplied via air ducts to the corresponding air-conditioning zones.

The general problem underlying current ventilation, heating or air-conditioning units together with their components, in particular the air flaps, is that the structural space which is available for the air-conditioning unit is very restricted, and these units therefore have to be constructed ever more compactly. In particular, air-conditioning units that are suitable for controlling different air-conditioning zones to different temperatures require a relatively large structural space because of their relatively large number of components.

SUMMARY OF THE INVENTION

Therefore, one object of the invention is to provide an improved heating or air-conditioning unit with which air which can in each case be temperature-controlled individually for the different air-conditioning zones of the vehicle, and which requires the smallest possible structural space.

In accomplishing one or more objects of the invention, there has been provided according to one aspect of the invention a heating or air-conditioning unit for a motor vehicle, comprising: a heating unit for generating heated air; a plurality of cold-air ducts bypassing the heating unit; a plurality of air-mixing spaces that are located downstream of the heating unit in the direction of air flow and that are separated from one another by at least one partition, each of the air-mixing spaces being in fluid communication with one of the cold air ducts and with the heating unit; air-flow control elements arranged so that cold and heated air can be introduced in a controllable manner into each mixing space in order to mix the air to a predetermined mixing temperature; and at least one conditioned-air duct communicating with each air-mixing space for supplying air which has been temperature-controlled separately to at least two air-conditioning zones in the vehicle, wherein the cold-air duct and the air-flow control elements are arranged to provide that at least one first partial air stream to be heated in the heating unit flows through a first assigned subregion of the heating unit in a first direction, and at least one second partial air stream to be heated in the heating unit flows through a second assigned subregion of the heating unit in a second direction opposed to the first direction.

Further objects, features and advantages of the invention will become apparent from the detailed description of preferred embodiments that follows, when considered together with the attached figures of drawing.

DETAILED DESCRIPTION OF PREFERRED EMBODIMENTS

Figure 1:
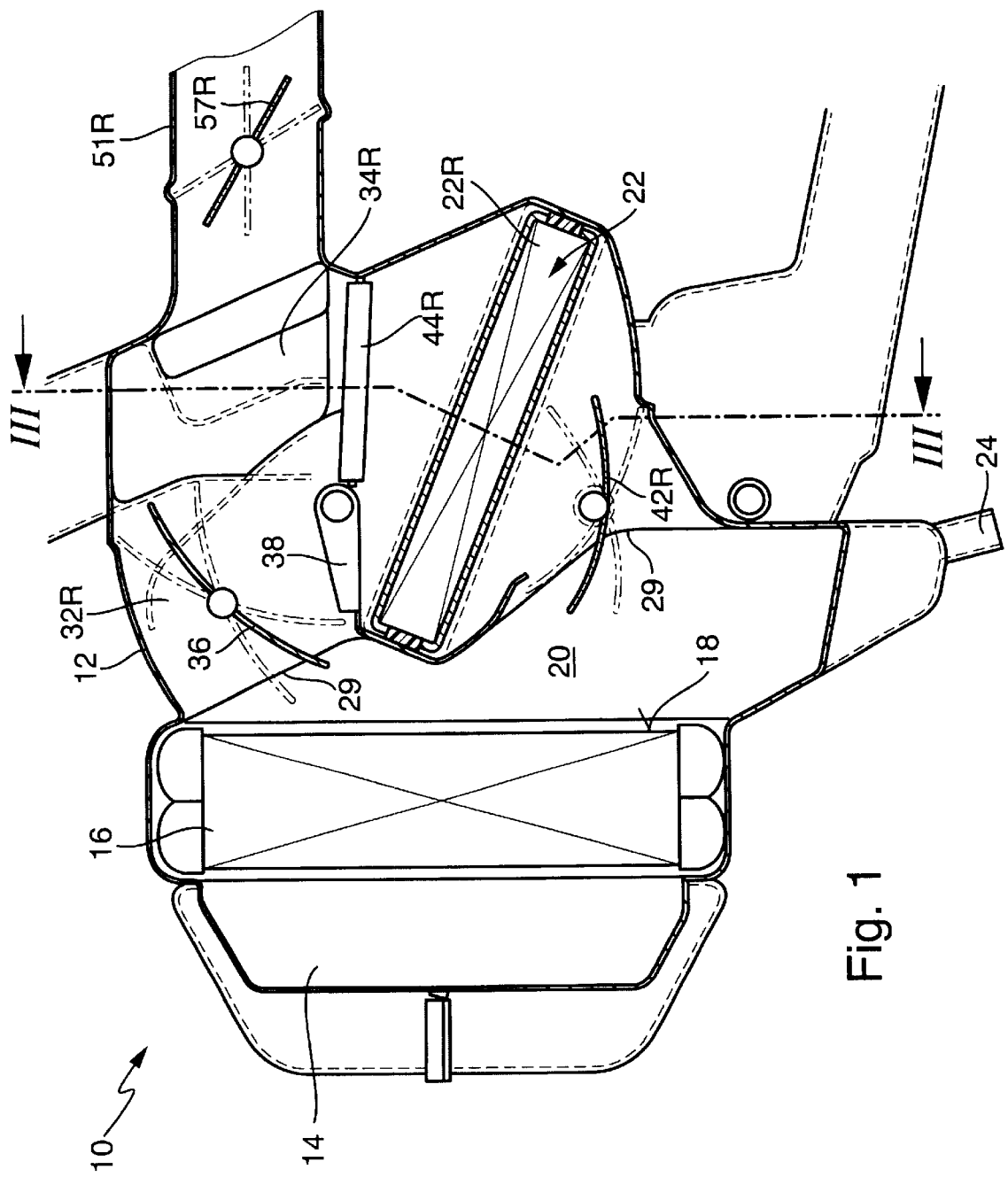
FIG. 1 is a cross sectional view of an air-conditioning unit according to the invention along a line I—I in FIG. 3, showing the region of the ducting for air supplied to a front region of the vehicle interior.

According to the invention, provision is made for at least one first partial air stream that is to be heated in the heating unit to flow through a first, assigned subregion of the heating unit in a first direction, and for at least one second partial air stream that is to be heated in the heating unit to flow through a second, assigned subregion of the heating unit in a second direction opposed to the first direction. This division of the air stream that is to be heated into at least two partial air streams which flow through the heating unit in opposite directions provides an unusual division and guiding of the air, but makes it possible for the air-mixing space assigned to the first partial air stream to be arranged on the one side of the heating unit, and for the air-mixing space assigned to the second partial air stream to be arranged on the other side of the heating unit. This produces the result that the air-mixing spaces are separated further away from one another than if they were arranged on the same side of the heating unit. As a result, the structural space available for the air-conditioning unit can be used skillfully.

The air-conditioning unit can be constructed substantially more compactly, and the air ducts leading from the individual air-mixing spaces to the air-conditioning zones in the vehicle interior can be conducted more easily in the region of the air-conditioning unit. Generally, at least three air ducts, namely, one leading into the footwell, one to the ventilating nozzles and one to the defroster nozzle, branch off from the air-mixing space, from which air is to be guided into the front-compartment region. In particular in the region where they are connected to the air-mixing space, these three ducts require a corresponding structural space that is scarcely available in air-conditioning units of the prior art, where the air-mixing spaces are arranged on the same side of the heating unit. However, according to the invention the second air-mixing space is arranged on the other side of the heating unit, thereby creating space for the arrangement of the air ducts.

The clear reduction in structural space creates further space for additional appliances arranged in the dashboard, for example, a navigation appliance, a CD player or the like.

It is particularly advantageous for the heating unit to be arranged so that it lies approximately flat or horizontal, i.e., in particular approximately at right angles to the evaporator. Thus, the first partial air stream can pass through the heating unit from top to bottom, and the second partial air stream can pass through it from bottom to top, or vice versa. The air-mixing spaces are then arranged above and below the heating unit. In this arrangement, there is a considerable reduction in the number of times that the air guided through the air-conditioning unit is deflected. In this case, the cold air essentially flows past the heating unit, whereas the air to be heated has to be slightly deflected so as to flow through the heating unit from bottom to top or from top to bottom. Losses of pressure can thereby be avoided, increasing efficiency, and, in particular, noises caused by the flow of air can be sharply reduced.

A further substantial advantage of the air-conditioning unit according to the invention is its cost neutrality. The design according to the invention does not incur any additional costs as compared with known air-conditioning units for the air-conditioning of four different air-conditioning zones.

In a preferred embodiment, three approximately parallel partitions are provided, with the result that the subregions of the heating unit, in which a partial air stream is heated in each case, are arranged next to one another. In each case two air-mixing spaces for a total of four air-conditioning zones are therefore formed on each side of the heating unit. An air-conditioning unit for air-conditioning four air-conditioning zones is provided, with the smallest possible structural space. The air ducts connected to the air-mixing spaces arranged on both sides of the heating unit can be arranged in a simple manner without problems of space occurring.

It is advantageous for the two outer air-mixing spaces to be assigned to the left and right of the rear compartment, and for the two inner air-mixing spaces to be assigned to the left and right of the front compartment, or vice versa. In particular, it is advantageous if the outer subregions of the heating unit, which are assigned to the partial air streams for the rear compartment, have the flow passing through them from top to bottom, and if the inner subregions of the heating unit, which are assigned to the partial air streams for the front compartment, have the flow passing through them from bottom to top. In this case, the air-mixing spaces for the rear compartment are arranged at the bottom, i.e., below the heating unit, and those for the front compartment are arranged above the heating unit, with the result that the air-guiding ducts connected to the air-mixing spaces for the rear compartment can be guided downward in the region of the vehicle floor into the rear compartment, and the air-guiding ducts connected to the air-mixing spaces for the front compartment can be guided upward, or can be guided to the side (above the outer regions and beyond the air-mixing spaces for the rear) to the corresponding outlets for the footwell, the ventilation and the defroster nozzles.

The partition arranged in each case on the air side downstream of the heating unit advantageously also extends upstream of the heating unit, through the cold-air duct as far as a cold-air region between an evaporator and the heating unit. In this way, the air that is to be heated is already guided separately right from the cold-air region until it reaches the individual air-mixing spaces.

In a preferred embodiment of the invention, the air-flow control elements are designed as approximately centrally mounted rotating flaps which are of slightly bent design, so that the rotating flaps, in their open position, can guide the air flowing past in a favorable manner. When the temperature setting is changed, by opening or closing the cold-air or hot-air flaps, only slight variations in the quantity of air are achieved. This makes it possible to avoid unstable air streams during the transfer of the flaps from a hot-air position into a cold-air position, or vice versa.

In another preferred aspect of the invention, the heating unit is designed as a heat exchanger through which coolant for a power plant of the motor vehicle can flow and in which electrical heating elements are integrated. Sufficient heating power can then be obtained even in the cold-starting phase of the engine via the electrical heating elements, irrespective of the direction in which the air to be heated flows through the heating units. The heating unit may be of integral design. Alternatively, however, the heating unit could also be formed from two individual heating units arranged next to each other, with one individual heating unit being provided for heating the air for the left half of the vehicle (front and rear compartment) and the other one being provided for the right half of the vehicle (front and rear compartment). A partition would then run between the individual heating units, and each individual heating unit would be divided by a further partition into two subregions for the front and rear compartment in each case.

The invention is explained in detail below with reference to the exemplary embodiments illustrated in the drawings.

A heating or air-conditioning unit 10 according to the invention, which is illustrated in FIG. 1, has a housing 12 for guiding air which is to be temperature-controlled. Recirculated air and/or fresh air is supplied via a fan (not illustrated) and an air-supply duct 14 to an evaporator 16 for cooling purposes. The air cooled in the evaporator 16 emerges from the evaporator 16 on its air-outlet side 18 and enters into a cold-air region 20 which extends over the entire height of the evaporator 16 downstream of the evaporator 16. Cold air is either guided from the cold-air region 20 around a heating unit 22 and supplied directly to air ducts, as is described in more detail below, or some of the cold air is guided through the heating unit 22 and heated there before being supplied to the air-guiding ducts. In order to obtain a predetermined desired temperature for the air directed into the vehicle passenger compartment by means of the air ducts, the cold air can be mixed with the heated air, as is described in detail below. The heating unit 22 is preferably designed as a heat exchanger through which coolant for a power plant of the motor vehicle can flow, and optionally additionally has electrical heating elements. A heat exchanger of this type is disclosed, for example, in DE 44 33 814, the disclosure of which is hereby incorporated by reference.

Provided at the lower end of the cold-air region 20 is a water outlet 24 through which condensation water condensed in the evaporator and discharged from the air-outlet side 18 can drain off.

The air-conditioning unit 10 according to the invention is suitable for the air-conditioning of four different air-conditioning zones in the vehicle interior. The four air-conditioning zones are, as a rule, the driver's region, denoted by VL (at the front on the left), the front-passenger's region, denoted by VR (at the front on the right), the rear region on the left, denoted by HL (at the rear on the left), and the rear region on the right, denoted by HR (at the rear on the right).

Figure 3:
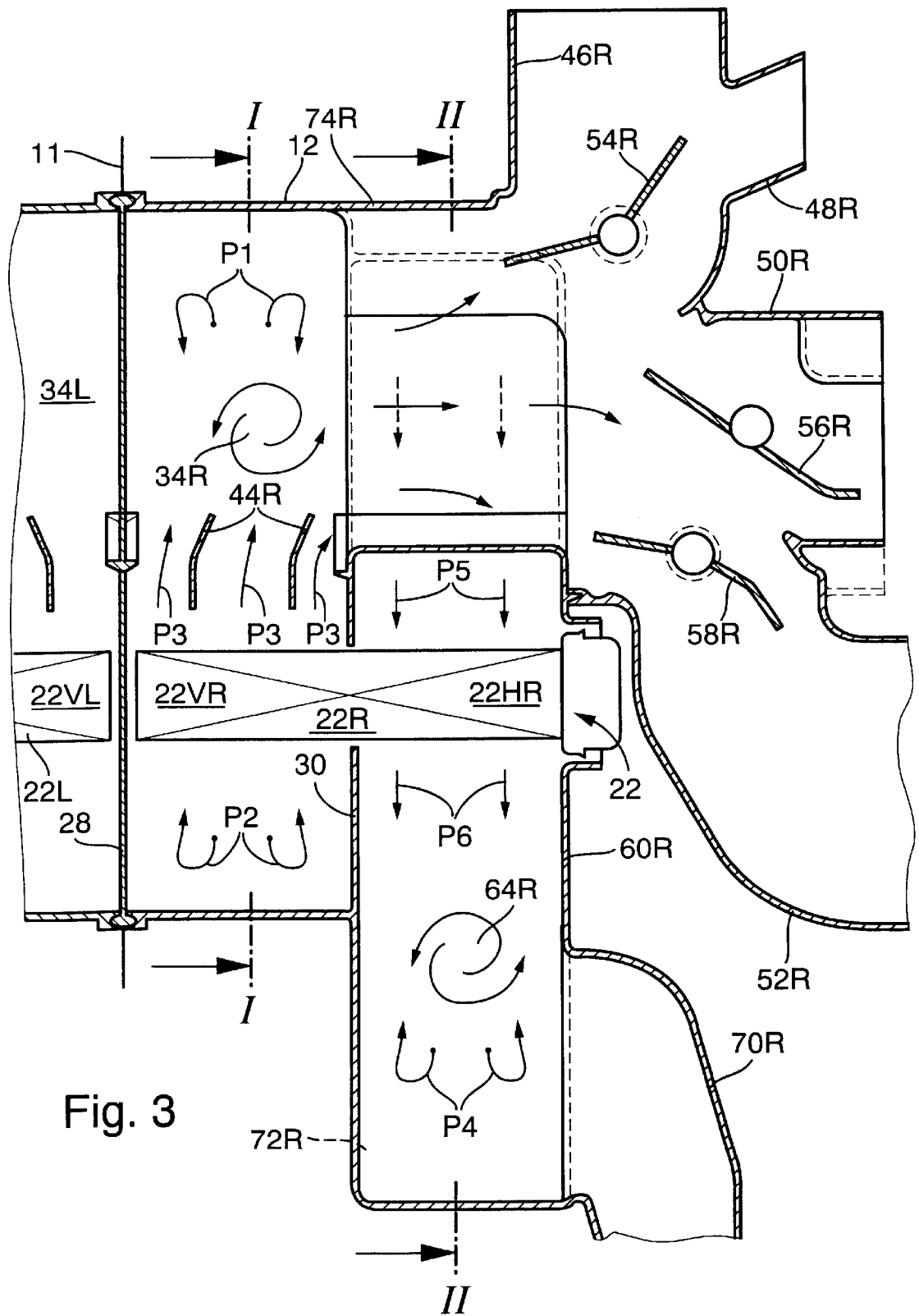
FIG. 3 is a cross sectional view of the air-conditioning unit according to the invention along the lines III—III in FIGS. 1 and 2.

So that the air for the individual zones can be temperature-controlled separately, the air-conditioning unit is divided downstream of the cold-air region 20 by three partitions into four regions lying next to one another and assigned to the zones HL, VL, VR and HR. The unit is of symmetrical design with respect to a central plane M, and therefore only the right half of the unit is illustrated in FIG. 3. Consequently, only the partitions 28 and 30 of the three partitions are illustrated, wherein the partition 28 lies in the central plane M. The partitions extend on the air-flow side, both in front of and behind the heating unit 22, from the cold-air region 20 as far as outlet openings to which air ducts are connected. The regions are arranged next to one another, and in each one a partial air stream for supplying the particular zone HL, VL, VR or HR in each case is guided. The regions are thus separated on the air side. The heating unit 22 is designed in a known manner as a heat exchanger, the pipes of which conduct the coolant of the vehicle engine and are part of a ribbed heating block running parallel to the partition planes, so that the partial air streams guided through the heating unit from the individual regions are not mixed with one another even when flowing through the heating unit 22.

As an alternative, it would also be possible, as FIG. 3 illustrates, to use two individual heating units 22L and 22R, so that the central partition 28 is continuous in the region of the heating units 22L and 22R. The individual heating units 22L and 22R are arranged lying next to each other in a common plane and together form the heating unit 22.

The air-conditioning unit according to the invention is of symmetrical design up to a central plane M in which the central partition 28 is also situated. In order to understand the structure of the air-conditioning unit according to the invention it is therefore sufficient to consider the cross sections from FIGS. 1 and 2 along the lines I—I and II—II from FIG. 3, together with the illustration from FIG. 3.

First of all, FIGS. 1 and 3 are used to describe those regions and elements of the air-conditioning unit which are relevant for the air-conditioning of the front region VR: Cold air can pass from the cold-air region 20 via a cold-air duct 32R, arranged above the heating unit 22R, into a mixing space 34R (arrows P1). The cold-air duct 32R can be closed via a cold-air bypass flap 36. In this arrangement, the cold-air duct 32R is bounded by the housing 12 and a housing element 38 and also by the partitions 28 and 30. In FIG. 1, the edge 29 of the partition 30 on the air-approach side can be seen above and below the heating unit 22.

Via a flap 42R, which is arranged on the air-flow side in front of (upstream of) the heating unit 22R, cold air which is to be heated can enter from below from the cold-air region 20 into a subregion 22VR of the heating unit 22R (arrows P2) and can pass through the latter and in the process be heated. The heated air (arrows P3) can enter through a warm-air opening, which can be closed by warm-air flaps 44R, into the mixing space 34R and be mixed there with the cold air. The warm-air flap 44R may be designed as an integral pivoting flap or may consist of a plurality of subflaps 44R (FIG. 3).

Connected to the air-mixing space 34R is an intermediate piece 74R from which there branch off a defrosting-air duct 46R, an air duct 48R to a defrosting side nozzle arranged on the right side of the vehicle, an air duct 50R to a ventilation nozzle on the right side of the vehicle, an air duct 51R to a ventilation nozzle arranged in the center of the dashboard, and a footwell air duct 52R. The air ducts can be closed in each case via a respective flap 54R, 56R, 57R or 58R (FIG. 3).

The air ducts 46R, 48R, 50R, 51R and 52R only lead in each case into the right half of the vehicle, with the result that the subregion between the partitions 28 and 30 is used for controlling the temperature of the air for the zone VR (right front).

Since the air-conditioning unit is of mirror-symmetrical design with respect to the central plane M, in the subregion between the partitions 26 and 28 the air for the zone VL is temperature-controlled in a similar manner and is guided from the corresponding air-mixing space 34L into corresponding air ducts (not illustrated in more detail).

The two inner subregions between the partitions are therefore preferably used for controlling the temperature of the air for the front compartment, the subregions 22VL and 22VR of the heating unit having the flow passing through them from bottom to top (in the orientation illustrated in FIG. 1).

Toward the outside, to the side of the air-conditioning unit (FIG. 3), further subregions are arranged next to the two inner subregions. The subregion between the partition 30 and a side wall 60R of the housing 12 is assigned to the right of the rear compartment (HR), and accordingly the subregion between the left partition (not illustrated in FIG. 3) and a left side wall (not illustrated in FIG. 3) is assigned to the left of the rear compartment (HL).

Figure 2:
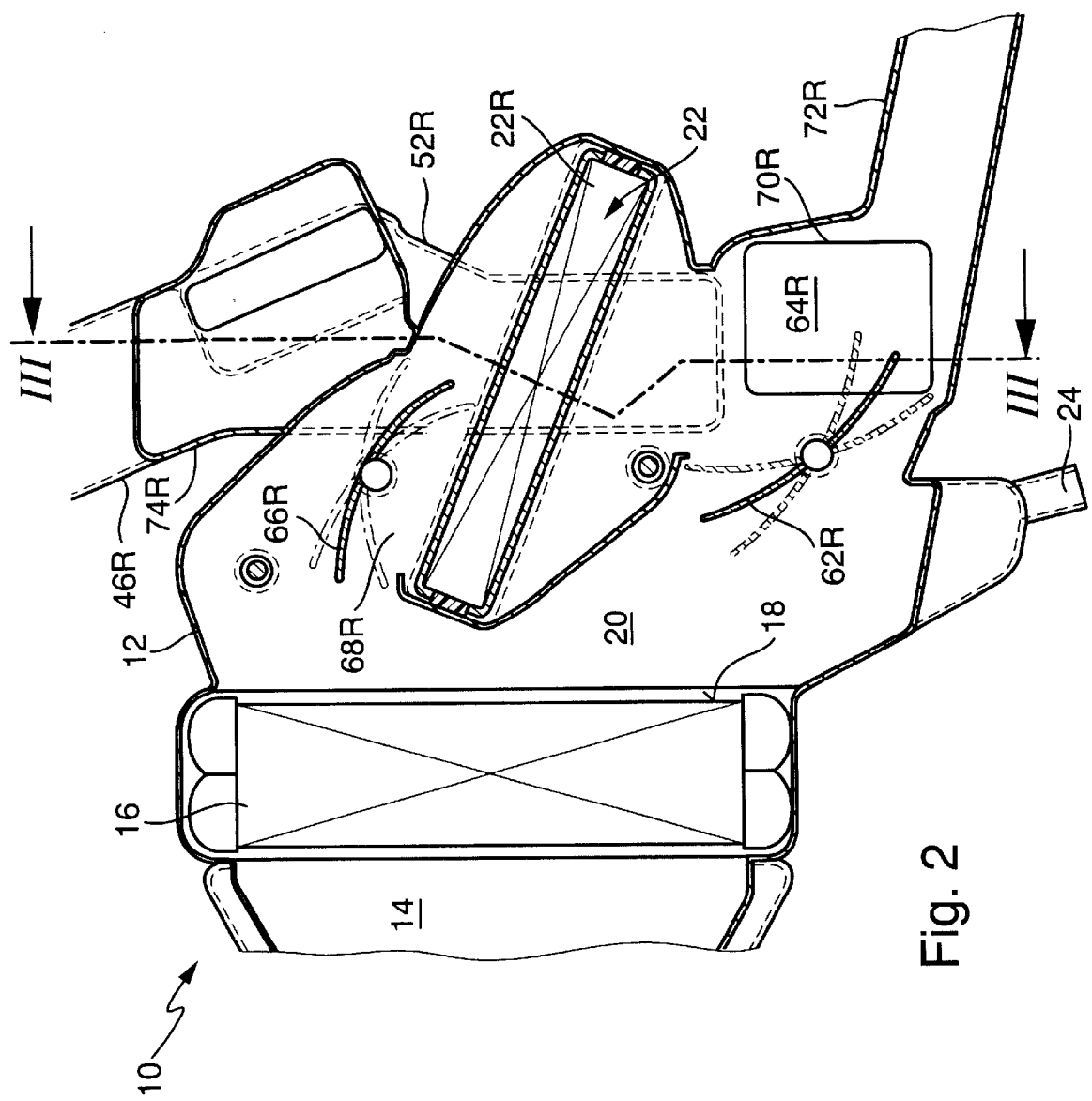
FIG. 2 is a cross sectional view of the air-conditioning unit according to the invention taken parallel to the cross section of FIG. 1, along a line II—II in FIG. 3, showing the region of the ducting for air supplied to a rear region of the vehicle interior.

FIG. 2 shows a cross section along the line II—II in FIG. 3, i.e., through the subregion in which the air for the zone HR is temperature-controlled. A cold-air bypass flap 62R is arranged here below the heating unit 22R, so that cold air from the cold-air region 20 can flow into an air-mixing space 64R arranged below the heating unit 22R (arrows P4). Above the heating unit 22R, a flap 66R is arranged on the air-flow side in front (upstream) of the heating unit. This flap is able to release an inlet opening 68R through which cold air can enter from above into the subregion 22HR of the heating unit 22R (arrows P5) and is heated there. The heated air emerging from the subregion 22HR penetrates directly into the air-mixing space 64R (arrows P6). From the air-mixing space 64R the air mixed there to a certain temperature can be supplied to the corresponding rear compartment zone HR via a rear footwell/rear-defrosting air duct 70R and a rear-ventilating air duct 72R. The rear footwell/rear-defrosting air duct 70R generally conducts hotter air than the rear-ventilating duct 72R in order to be able to supply hotter air to the rear footwell and/or the rear window panes.

The air for the rear-compartment zone HL can be temperature-controlled in a similar manner, using the leftmost subregion of the unit, that is identical in structure and operation to the subregion shown in FIG. 2.

As emerges in particular from FIG. 3, the air-mixing spaces 34R and 34L, from which the air is guided to the front compartment, are arranged above the heating unit 22, and the air-mixing spaces 64R and 64L are arranged below the heating unit 22, with the result that the air ducts connected to the air-mixing spaces can be arranged one above another in an advantageous manner that saves on structural space. In particular, the air ducts 46R, 48R, 50R, 52R together with their intermediate piece 74R connecting the inlet openings of the air ducts to the air-mixing space 34R are more or less placed on that subregion of the housing which is arranged between the partition 30 and the side wall 60R (FIG. 3).

Some of the air flaps are of bent design and some are of angled design, in order in each case to be able to guide the air flowing past the air flaps in a manner favorable for flow.

Two control devices are preferably provided, namely, one in the front region and one in the rear region of the passenger compartment, and the heating or air-conditioning unit according to the invention can be controlled by them in order to control the temperature of the particular air-conditioning zone. The temperature control takes place automatically via a respective temperature sensor in the front or rear region starting from set desired values for the temperature.

Figure 4:
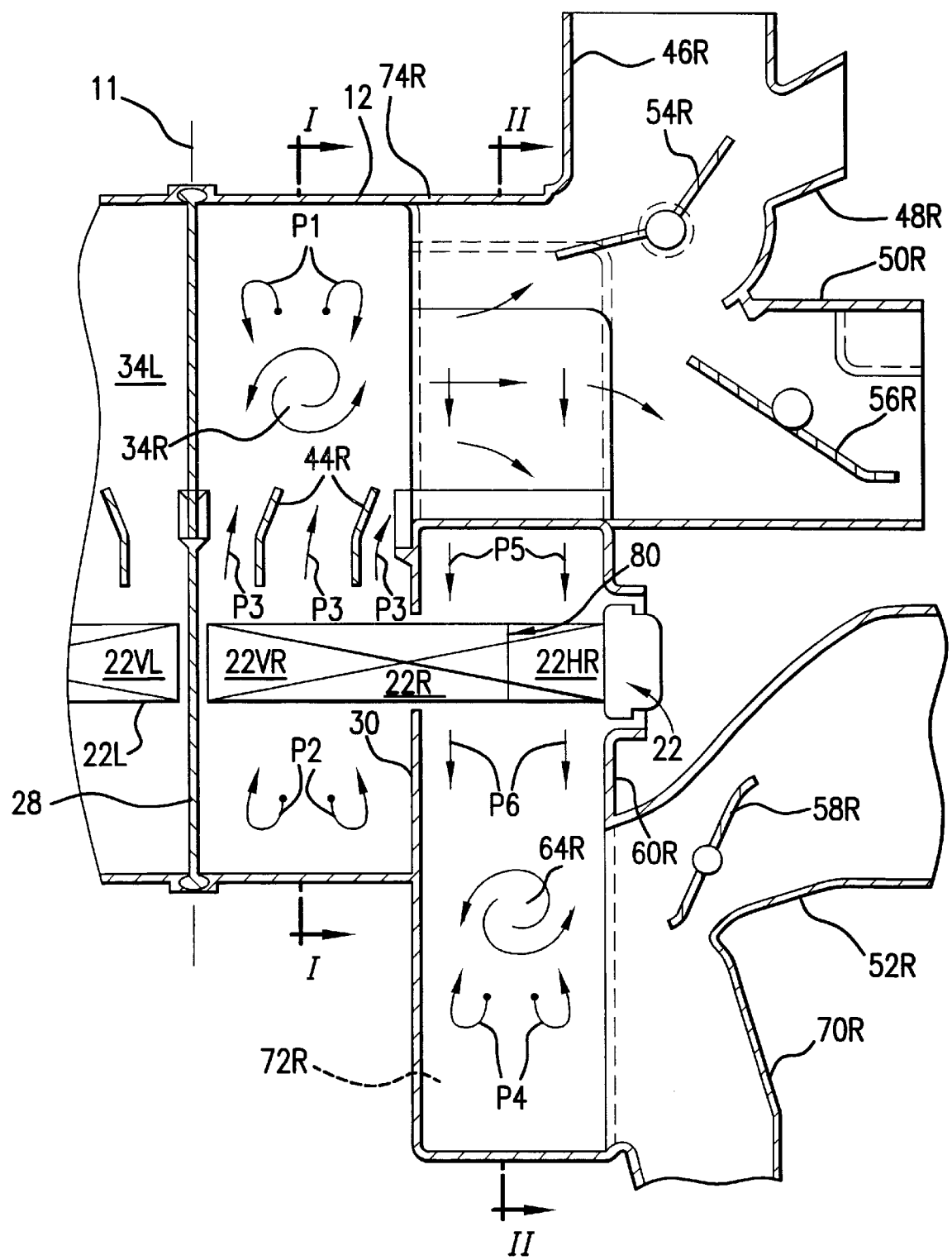
FIG. 4 is a view similar to FIG. 3, illustrating an alternative embodiment of the invention.

In FIG. 4 there is illustrated, similarly to FIG. 3, a cross-section of a further embodiment of the invention.

In this embodiment, the footwell air duct 52R branches off not from the air-mixing space 34R for the front-passenger's region VR, but rather from the air-mixing space 64R for the rear seat area. The air-mixing space 64R therefore does not serve exclusively the rear passenger area HR, but rather serves also the footwell of the front passenger compartment VR.

As a result of this branching arrangement of the footwell air duct 58R from the air-mixing space 64R, it is possible, by means of suitable adjustment of the mixing temperatures for the front and rear passenger areas, to achieve a desired temperature layering in the vertical direction in the right front passenger area VR, i.e., a temperature difference within the zone YR between the footwell region and the upper body or head region. As a rule, it is found to be comfortable if the footwell temperature is somewhat higher than the temperature at the level of the head. The same obviously applies with respect to the left side of the passenger compartment, i.e., for the footwell air duct that branches off from the air-mixing space for the rear seat area HL. In the drawing, only the right half of the apparatus is illustrated, for simplicity, inasmuch as the left side is identical in structure and operation.

In this second embodiment, therefore, a heating or air-conditioning unit is provided that is capable not only of conditioning air to different temperatures for four zones of the vehicle passenger compartment, but in addition is also capable of producing a temperature layering effect within the two front passenger zones VR and VL, in order to further increase the comfort level of the passengers.

The disclosure of the German priority application, No. 199 62 084.9, filed Dec. 21, 1999, is hereby incorporated by reference.

Although the invention has been described in terms of several preferred embodiments, it is understood by those skilled in the art that other embodiments can be designed to operate in accordance with the principles of the invention. It is intended that the accompanying claims will cover all reasonably comprehended equivalents of the disclosed invention.

What is claimed is:

1. A heating and air-conditioning unit for a motor vehicle, said heating and air-conditioning unit comprising:

a heating unit for generating heated air;

a plurality of cold-air ducts bypassing the heating unit; an air flow direction;

a plurality of air-mixing spaces that are located downstream of the heating unit in the direction of air flow and that are separated from one another by at least one partition, each of the air-mixing spaces being in fluid communication with one of the cold air ducts and with the heating unit;

air-flow control elements arranged so that cold and heated air can be introduced in a controllable manner into each mixing space in order to mix the air to a predetermined mixing temperature; and at least one conditioned-air duct communicating with each air-mixing space for supplying air which has been temperature-controlled separately to at least two air-conditioning zones in the vehicle, wherein the cold-air ducts and the air-flow control elements are arranged to provide that at least one first partial air stream to be heated in the heating unit flows through a first assigned subregion of the heating unit in a first direction, and at least one second partial air stream to be heated in the heating unit flows through a second assigned subregion of the heating unit in a second direction opposed to the first direction.

2. The heating and air-conditioning unit as claimed in claim 1, wherein the heating unit is arranged to lie substantially horizontally.

3. The heating and air-conditioning unit as claimed in claim 1, comprising three substantially parallel partitions defining four subregions of the heating unit arranged next to one another, and comprising two air-mixing spaces positioned on each side of the heating unit, providing for a total of four air-conditioning zones.

4. The heating and air-conditioning unit as claimed in claim 3, wherein two outermost air-mixing spaces are respectively assigned to the left and right sides of a rear passenger compartment zone, and two innermost air-mixing spaces are respectively assigned to the left and right sides of a rear passenger compartment zone, and the two innermost air-mixing spaces are respectively assigned to the left and right sides of a front passenger compartment, or vice versa.

5. The heating and air-conditioning unit as claimed in claim 4, wherein outer subregions of the heating unit have a flow passing through the outer subregions from top to bottom, and inner subregions of the heating unit have the flow passing through the inner subregions from bottom to top.

6. A heating or air-conditioning unit as claimed in claim 4, wherein the two air-mixing spaces assigned to the left and right sides of the rear passenger compartment further comprise, in each case, a front footwell air duct communicating with the respective air-mixing space for supplying conditioned air to the left and right side front passenger compartment footwells.

7. The heating and air-conditioning unit as claimed in claim 1, wherein a portion of each partition also extends upstream with respect to said air flow direction to define a respective cold-air duct.

8. The heating and air-conditioning unit as claimed in claim 7, further comprising an evaporator positioned upstream of the heating unit, to define a cold-air region between the evaporator and the heating unit, and wherein said portion of each partition extends as far as the cold-air region.

9. The heating and air-conditioning unit as claimed in claim 1, wherein the air-flow control elements comprise substantially centrally mounted rotating flaps which are of bent or angled design, whereby the rotating flaps, in an open position, can guide air flowing past in a manner favorable for flow.

10. The heating and air-conditioning unit as claimed in claim 1, wherein the heating unit comprises a heat exchanger through which coolant for a power plant of the motor vehicle flows, and said heat exchanger includes electrical heating elements integrated in said heat exchanger.

11. The motor vehicle comprising a front passenger compartment portion and a rear passenger compartment portion, and a heating and air-conditioning unit for supplying conditioned air to said passenger compartment portions, wherein the heating and air-conditioning unit comprises:

a heating unit for generating heated air;

a plurality of cold-air ducts bypassing the heating unit;

an air flow direction;

a plurality of air-mixing spaces that are located downstream of the heating unit in the direction of air flow and that are separated from one another by at least one partition, each of the air-mixing spaces being in fluid communication with one of the cold air ducts and with the heating unit;

air-flow control elements arranged so that cold and heated air can be introduced in a controllable manner into each mixing space in order to mix the air to a predetermined mixing temperature; and at least one conditioned-air duct communicating with each air-mixing space for supplying air which has been temperature-controlled separately to at least two air-conditioning zones in the vehicle, wherein the cold-air ducts and the air-flow control elements are arranged to provide that at least one first partial air stream to be heated in the heating unit flows through a first assigned subregion of the heating unit in a first direction, and at least one second partial air stream to be heated in the heating unit flows through a second assigned subregion of the heating unit in a second direction opposed to the first direction.

* * * * *